(12) United States Patent
Samarasinghe (10) Patent No.: US 7,180,912 B1
(45) Date of Patent: Feb. 20, 2007

(54) SYSTEM AND METHOD FOR PROVIDING A PLURALITY OF MULTI-MEDIA SERVICES USING A NUMBER OF MEDIA SERVERS TO FORM A PRELIMINARY INTERACTIVE COMMUNICATION RELATIONSHIP WITH A CALLING COMMUNICATION DEVICE (75) Inventor: Harish Samarasinghe, Holmdel, NJ (US)

(73) Assignee: AT&T Corp., New York, NY (US)

( * ) Notice: Subject to any disclaimer, the term of this patent is extended or adjusted under 35 U.S.C. 154(b) by 758 days.

(21) Appl. No.: 10/337,203

(22) Filed: Jan. 6, 2003

(51) Int. Cl.
*H04J 3/24* (2006.01)
(52) U.S. Cl. ............. 370/474; 370/395.5; 370/395.51; 370/395.52; 370/395.53; 370/395.54; 370/465; 370/466; 370/467; 370/469; 370/471; 370/473; 379/90.01
(58) Field of Classification Search ............. 370/395.5, 370/395.51–395.54, 465–474; 379/90.02
See application file for complete search history.

(56) References Cited

U.S. PATENT DOCUMENTS

| | | | |
|---|---|---|---|
| 5,790,176 A | 8/1998 | Craig | |
| 5,867,494 A | 2/1999 | Krishnaswamy et al. | |
| 5,926,649 A | 7/1999 | Ma et al. | |
| 6,356,294 B1 | 3/2002 | Martin et al. | |
| 6,404,746 B1 * | 6/2002 | Cave et al. | 370/262 |
| 6,438,594 B1 | 8/2002 | Bowman-Amuah | |
| 2002/0176557 A1 * | 11/2002 | Burger | 379/207.02 |
| 2003/0012150 A1 * | 1/2003 | Chapuran et al. | 370/271 |
| 2003/0108179 A1 * | 6/2003 | Chang et al. | 379/220.01 |

* cited by examiner

*Primary Examiner*—Fan Tsang
*Assistant Examiner*—Hemant S. Patel (57) ABSTRACT

A system and method for processing a plurality of requests for multi-media services received at a call control element (CCE) defined on the system from a calling communication device. The system includes a Network Routing Element, a Service Broker (SB), at least a primary media severs (MS) and at least a secondary MS, a plurality of application servers (ASs) and a plurality of border elements, all of which are coupled to the CCE. The SB is adapted to receive a plurality of requests including parameters for requesting multi-media services, via the CCE, and to selectively redirect the requests to one or more ASs for providing feature processing for the requests. The ASs can instruct either the primary MS or secondary MS, via the CCE, to form a preliminary interactive communication path with the calling communication device for collecting caller-entered data, which can be validated prior to providing the feature processing.

10 Claims, 3 Drawing Sheets

SYSTEM AND METHOD FOR PROVIDING A PLURALITY OF MULTI-MEDIA SERVICES USING A NUMBER OF MEDIA SERVERS TO FORM A PRELIMINARY INTERACTIVE COMMUNICATION RELATIONSHIP WITH A CALLING COMMUNICATION DEVICE

FIELD OF THE INVENTION

The present invention relates generally to a system and method for processing a plurality of requests for a plurality of multi-media services and, more specifically, to a system and method for processing a plurality of requests for a plurality of multi-media services by selectively directing the requests to at least one media server for forming a preliminary multi-media communication path between the media server and a calling communication device to permit the media server to play announcements to and collect caller-entered data from the calling communication device.

BACKGROUND

Application service providers operating on a Local Area Network (LAN), such as AT&T, can receive a number of requests from various users of Session Initiation Protocol (SIP) enabled communication devices operating on a Wide Area Network (WAN) for any one or more of a plurality of multi-media service offerings. These requests may be directed to a predetermined application server of a plurality of application servers associated with the application service provider, which is adapted to provide feature processing for the requested multi-media service.

As application service providers continue to add multi-media service offerings and corresponding application servers for providing feature processing for each of the requested multi-media services, there is an increasing need to support preliminary multi-media communications with customers operating at the various SIP-enabled communication devices to collect caller-entered data and to process the caller-entered data to determine if the customer is authorized to receive the requested multi-media service.

Therefore, an unsolved need remains for a multi-media communication service provider system that is adapted to provide a direct multi-media interface with SIP-enabled communication devices for supporting preliminary multi-media communications between the multi-media communication service provider system and the number of SIP-enabled communication devices operating on the WAN.

SUMMARY OF THE INVENTION

In accordance with principles of the present invention, a system and method for processing a plurality of requests for a plurality of multi-media services received at a multi-media services provider system is set forth. The system processes the multi-media service requests received at the multi-media services provider system to form a multi-media communication path between at least a first communication device and at least a second communication device of a plurality of communication devices.

In one aspect, the multi-media services provider system includes a call control element adapted to receive at least a first request message for at least one multi-media service from the first communication device. The call control element processes the first request message to generate a second request message for at least one multi-media service including predetermined attributes of the first request message. A service broker coupled to the call control element is adapted to receive and process the second request message to generate a first redirect message. The call control element receives and processes the first redirect message to generate a third request message including predetermined attributes of the first redirect message. At least one application server coupled to the call control element is adapted to receive and process the third request message to generate a second redirect message.

The second redirect message includes at least a first contact header having address-related information associated with a primary media server, which is coupled to the call control element and to the application server. The second redirect message further includes a second contact header having address-related information associated with a secondary media server, which is also coupled to the call control element and to the application server. In addition, the second redirect message includes a transaction identifier field that triggers the application server to access a corresponding customer account and bypass predetermined account logic and jump to predetermined data validation logic. The second redirect message may also include address-related information associated with predetermined audio scripts.

In another aspect of the present invention, a method of processing multi-media service requests received at a multi-media services provider system to form a multi-media communication path between at least a first communication device and at least a second communication device of a plurality of communication devices is set forth. The method includes receiving at least a first request message for at least one multi-media service at a call control element located on the multi-media services provider system from the first communication device. The first request message is processed at the call control element located on the multi-media services provider system to generate a second request message for the at least one multi-media service, which includes predetermined attributes of the first request message. The second request message is received and processed at a service broker located on the multi-media services provider system for generating a first redirect message, which includes predetermined attributes of the second request message. The first redirect message is received and processed at the call control element located on the multi-media services provider system for generating a third request message including predetermined attributes of the first redirect message.

The third request message is received and processed at one or more application servers located on the multi-media services provider system for generating a second redirect message. The second redirect message includes at least a first contact header having address-related information associated with a primary media server located on the multi-media services provider system. The second redirect message further includes a second contact header having address-related information associated with a secondary media server located on the multi-media services provider system.

The method further includes receiving and processing the second redirect message at the call control element to generate a fourth request message, which in an exemplary embodiment includes a Content-Type header having a multipart/mixed media type. The fourth request message further includes a first message body portion including session description protocol associated with the first request message and a second message body portion including service-related parameters to establish an interactive session with a predetermined caller.

The method further includes querying the primary media server for determining whether the primary media server includes resources for processing the fourth request message. The fourth request message is received at the primary media server if it is determined that the primary media server includes resources for processing the fourth request message. The fourth request message is processed at the primary media server to form an interactive communication path between the primary media server and the first communication device.

After forming the interactive communication path between the primary media server and the first communication device, the method includes receiving user-entered data at the primary media server and communicating the user-entered data to at least one application server located on the multi-media services provider system for validation. If the user-entered data is determined to be valid, the method further includes generating a fifth request message at the application server including address resolution instructions. If the user-entered data is determined to be invalid, the method further includes playing a termination announcement to the first communication device.

If the user-entered data is determined to be valid, as described above, the method further includes receiving and processing the fifth request message at the call control element for generating a sixth request message that includes predetermined routing information. The sixth request message is received and processed at the network routing element for generating a third redirect message. The third redirect message is received and processed at the call control element for generating a seventh request message.

The seventh request message is received and processed at the second communication device, whereby the second communication device initiates a predetermined protocol for forming a multi-media communication path between the first communication device and the second communication device.

In another aspect, if the primary media server includes insufficient resources for processing the fourth request message, the method includes querying the secondary media server for determining whether the secondary media server includes resources for processing the fourth request message. If it is determined that the secondary media server includes resources for processing the fourth request message, the method includes receiving and processing the fourth request message at the secondary media server to form an interactive communication path between the secondary media server and the first communication device.

In another aspect, a method of processing multi-media service requests received at a multi-media services provider system is set forth to form a multi-media communication path between at least a first communication device and at least a second communication device of a plurality of communication devices. The method further includes receiving at least one request message for at least one multi-media service at an application server of a plurality of application servers located on the multi-media services provider system. The at least one request message is processed at the application server for generating a redirect message. The second redirect message includes at least a first contact header having address-related information associated with a primary media server located on the multi-media services provider system. In addition, the second redirect message includes at least a second contact header having address-related information associated with a secondary media server located on the multi-media services provider system.

BRIEF DESCRIPTION OF THE DRAWING

The foregoing and other objects of this invention, the various features thereof, as well as the invention itself, can be more fully understood from the following description, when read together with the accompanying drawings in which.

DETAILED DESCRIPTION OF THE INVENTION

Figure 1:
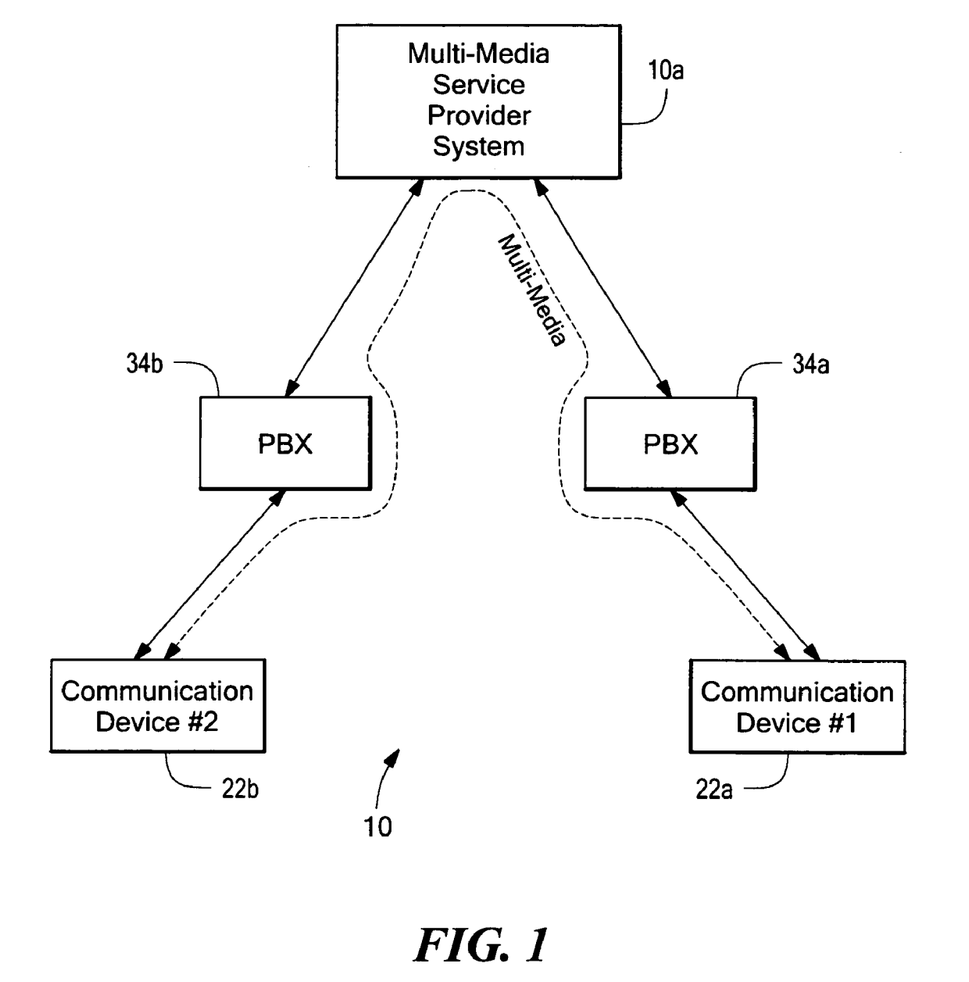
FIG. 1 is an exemplary high-level schematic block diagram of a system for providing multi-media communications between a plurality of communication devices according to the present invention.

FIG. 1 shows one embodiment of a communication network 10 for providing multi-media communications between at least first 22a and second 22b communication devices of a plurality of communication devices, in accordance with the present invention. The communication network 10 includes a multi-media provider system 10a, which is operative to provide a plurality of multi-media services to the first 22a and second 22b communication devices, via respective first 34a and second 34b SIP-enabled IP-Private Branch Exchanges (hereinafter referred to as "PBXs"). It should be understood that the multi-media services provider system 10a is additionally operative to provide a plurality of multi-media services to a plurality of other communication devices not specifically shown herein.

Figure 2:
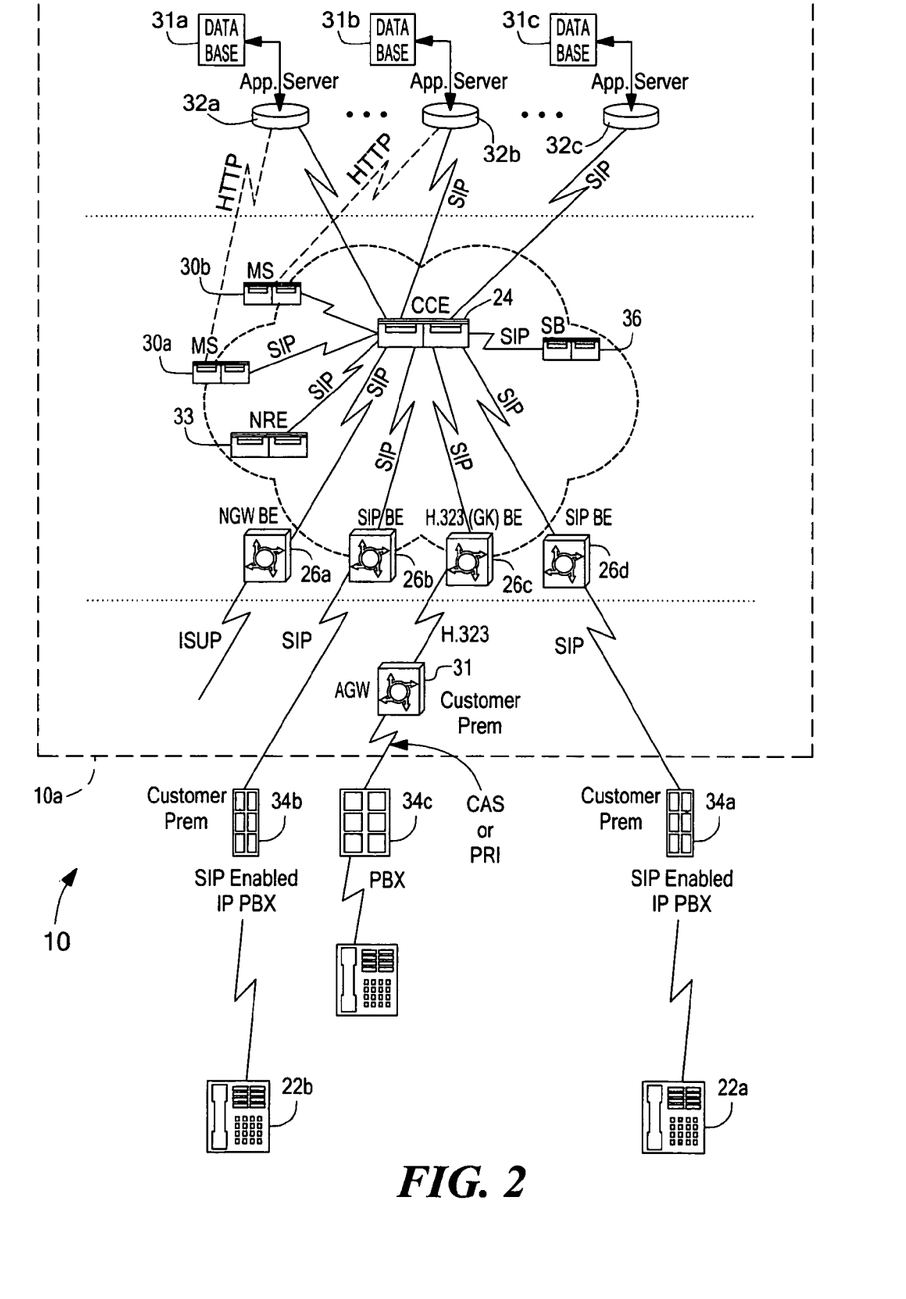
FIG. 2 is an expanded schematic block diagram of the system shown in FIG. 1.

Referring to FIG. 2, in the exemplary embodiment, the multi-media services provider system 10a includes a centrally located Call Control Element 24 (CCE), a plurality of Media Servers (MSs) 30a and 30b, a plurality of Application Servers (ASs) 32a, 32b, 32c (collectively referred to hereinafter as ASs 32a–32b) at least one Network Routing Engine (NRE) 33, at least one Service Broker (SB) 36 and a plurality of Border Elements (BEs) 26a, 26b, 26c, 26d (collectively referred to hereinafter as BEs 26a–26d). The CCE 24 is coupled to the plurality of ASs 32a–32c, to the plurality of BEs 26a–26d and to the plurality of MSs 30a and 30b. The CCE is further coupled to the NRE 33 and to the SB 36.

Although the first MS 30a is shown as being coupled to the first AS 32a, it should be understood that the first MS 30a can be coupled to the second AS 32b and/or to the third 32c AS, as well as to a number of other application servers not specifically shown herein. Similarly, although the second MS 30b is shown as being coupled to the second AS 32b, it should be understood that the second MS 30b can be coupled to the first AS 32a and/or to the third 32c AS, as well as to a number of other application servers not specifically shown herein. In an exemplary embodiment, the first MS 32a can be defined as a "primary MS 32a" for which interactions with calling communications devices 22a or 22b can be first attempted. Further, the second MS 32b can be defined as an "alternate or secondary MS 32b" for which interactions with calling communications devices 22a or 22b can be alternately attempted in the event that the primary MS 32a is busy or does not have sufficient resources to perform the caller interaction.

In the exemplary embodiment, the fourth BE 26d is coupled to the first PBX 34a and the second BE 26b is coupled to the second PBX 34b. Further, the third BE 26c is coupled to PBX 34c, via an access gateway 31, and is adapted for operation using the H.323 protocol. It should be understood that the BEs 26a–26d can be coupled to a plurality of other PBXs (not shown), which are included in other embodiments not specifically shown herein.

In the exemplary embodiment, the first PBX 34a is coupled to the first communication device 22a. Further, the second PBX 34b is similarly coupled to the second communication device 22b.

The CCE 24, for example, can be provided by Lucent Corporation of Murray Hill, N.J. The CCE 24 may be defined as a back-to-back user agent (B2BUA), which operates to receive a plurality of INVITE messages from any one of the plurality of BEs 26a–26d and upon receipt of the plurality of INVITE messages from the plurality of BEs 26a–26d, the CCE 24 can initiate an equal plurality of INVITE messages to the SB 36. The CCE 24 is further adapted to receive a plurality of Redirect messages from the SB 36 in response to the plurality of INVITE messages sent to the SB 36 from the CCE 24. When the CCE 24 receives a Redirect message back from the SB 36 in response to an INVITE message and depending on instructions provided by the SB 36 in the Redirect message, the CCE 24 can either send an INVITE message to one or more of the plurality of ASs 32a–32c for feature processing for the call or the CCE 24 can send an INVITE message to the NRE 33 (i.e. feature processing is not required for the call) to bypass the plurality of ASs 32a–32c and set up the call. The CCE 24 is further adapted to maintain the call state between the first 22a and the second 22b communication devices and to generate a call detail record (CDR) based on instructions received from any one or more of the plurality of ASs 32a–32c.

The CCE 24 is also adapted to use "Third Party Call Control," which is described in the reference, "Third Party Call Control in SIP" by Rosenberg, Peterson, Schulzrinne, Camarillo, RFC-Draft, Internet Engineering Task Force, Mar. 2, 2001," which is herein incorporated by reference. The Third Party Call Control feature of the CCE 24, permits the CCE 24 to create a call in which communication is actually between other parties. For example, an operator can use Third Party Call Control to create a call that connects two participants together or similarly, the CCE 24 use Third Party Call Control to connect the primary MS 30a and the first communication device 22a. Generally, Third Party Call control allows the CCE to connect the various end callers without having the media stream pass through the CCE 24 and yet, the CCE 24 can still maintain call state information.

In the exemplary embodiment, the plurality of BEs 26a–26d can be provided by Lucent Corporation of Murray Hill, N.J. In one embodiment, the plurality of BEs 26a–26d are adapted to use SIP as the signaling protocol for interfacing with the CCE 24. Further first BE 26a is adapted to interface to a circuit network (not shown) using an ISDN user port included thereon. The second BEs 26b and the fourth 26d are adapted to use SIP as the signaling protocol for interfacing with the first 34a and second 34b PBXs. The third BE 26c is adapted to use H.323 as the signaling protocol for interfacing with the PBX 34c, via the Access Gateway (AGW) 31. In the exemplary embodiment, the plurality of BEs 26a–26d may be thought of as a SIP B2BUA because each of the BEs 26a–26d generates SIP messages as well as receives requests from SIP endpoints, such as the SIP-enabled first 34a and second 34b PBXs, and either processes the requests itself or forwards the requests to the CCE 24 for processing.

In the exemplary embodiment, the SB 36 can also be provided by Lucent Corporation of Murray Hill, N.J. In one embodiment, the SB 36 acts as the SIP Redirect Server. The SB 36 operates to identify a particular service request, which is included in the INVITE message received at the SB 36 from the CCE 24. The SB further operates to instruct the CCE 24, via a Redirect message, to redirect the call to one or more of the plurality of ASs 32a–32c for service processing. In an embodiment, the SB 36 can identify a particular service requested by the call based on ANI or DN information included in the INVITE message received at the SB 36 from the CCE 24. In addition, the SB 36 may perform call screening based on the Charge Party Station Type (a.k.a. OLI-Originating Line Information) received in the INVITE message at the SB 36.

After the SB 36 determines which of the first AS 32a, second AS 32b or third AS 32c as the primary and secondary processors for processing a particular call request, the SB 36 generates a SIP Redirect "300 Multiple Choice" message and populates the IP address/Port number combinations of the (primary/secondary) AS 32a, 32b or 32c in the Contact headers of the "300 Multiple Choice" message, and sends it to the CCE 24. This approach permits the CCE 24 to query the secondary AS 32a, 32b or 32c in the event that the primary AS 32a, 32b or 32c is overloaded or not available to process the call request. If the SB 36 does not find a ANI or Dialed number match in the INVITE message received from the CCE 24, but has a carrier other than the multi-media service provider system 10a (e.g. AT&T), the SB 36 may send another SIP Redirect "300 Multiple Choice" to the CCE 24 with the IP address of the NRE 33 indicating that the call request does not require AS 32a–32c processing, which effectively bypasses any service processing at the plurality of ASs 32a–32c.

In the exemplary embodiment, the plurality of ASs 32a–32c can each include a conventional computer server, such as an "NT-Server," which can be provided by Microsoft of Richmond, Wash. or a "Unix Solaris Server," which can be provided by Sun Micro Systems of Palo Alto, Calif. The ASs 32a–32c can be programmed with conventional Web-page interface software such as: "Visual Basic," "Java," "JavaScript," "HTML/DHTML," "C++," "J+," "Perl," or "Perlscript," and "ASP." The ASs 32a–32c can each further be programmed with an operating system, Web server software and Web Application software, such as an e-commerce application and computer network interface software.

In addition, the ASs 32a–32c contain the intelligence needed for offering multimedia services such as Toll-Free Calling or 800-Service, Virtual Private Networks, and various multimedia features like email, "Click-To-Dial". The intelligence may be comprised of customer logic and data, as well as, common logic and data that are used by all customers. It is necessary for the CCE 24 to access the logic and data in the ASs 32a–32c in order to provide the multi-media services or features. The receipt of an HTTP form Post message at any one of the ASs 32a–32c, which includes a transaction ID, will trigger any one of the ASs 32a–32c to access the corresponding customer account and bypass the initial steps of the account logic and jump to the appropriate data validation logic.

The ASs 32a–32c can each be further respectively coupled to databases 31a–31c, which each contain a service intelligence layer adapted for providing the plurality of multi-media services described above. The intelligence layer may include customer logic and data, as well as common logic and data that is used by communication devices 22a, 22b, as well as a plurality of other communication devices not specifically shown in FIG. 2.

The NRE 33 also operates as a SIP Redirect Server. The NRE 33 processes INVITE messages received from the CCE 24; performs address resolution based on the routing number returned from the AS 32a–32c and generates a Redirect "300 Multiple Choice" message. The NRE 33 populates Redirect 300 Multiple Choice message with the IP addresses of one or more destination BEs 26a–26d and sends the Redirect 300 Multiple Choice message to the CCE 24. In an embodiment, the NRE 33 can send the Redirect 300 Multiple Choice message to the CCE 24 with a predetermined hierarchical list of IP addresses corresponding to a predetermined hierarchical order of BEs 26a–26d for processing the call. In this arrangement, a highest level BE 26a, 26b, 26c or 26d defined on the list can receive and process the call and if the highest level BE 26a, 26b, 26c or 26d is unable to process the call or has insufficient resources to do so, the call may be redirect by the CCE 24 to a next successive BE 26a, 26b, 26c or 26d defined on the hierarchical list.

The first 22a and second 22b communication devices can include a plurality of SIP-enabled devices, such as telephones, personal computers and IP-Private Branch Exchanges ("PBXs"). In addition, the first 22a and second 22b communication devices can include a plurality of SIP-enabled wireless devices, such as cellular telephones, pagers and personal digital assistants ("PDAs").

The primary MS 30a and the secondary MS 30b of the exemplary embodiment, are both similarly constructed and arranged to provide a plurality of predetermined announcements to the communication devices 22a, 22b and to collect information from the communication devices 22a, 22b (e.g. caller-entered data). For example, if the caller is required to enter digits or a phrase for a Call Prompter service or SDN (Software Defined Network) service, the primary MS 30a, for example, will play the announcement prompting the caller to enter the required information. The primary MS 30a also collects the information entered by the caller. The primary MS 30a plays the announcements to the caller based on the instructions and announcement ID provided in the second INVITE message. In one embodiment, the announcements can include "Service Terminating" announcements or announcements for the caller to enter an authorization code, account code, or "call-prompter" digits.

In an exemplary embodiment, the primary MS 30a and the secondary MS 30b are each respectively defined as VoiceXML based MSs 30a and 30b. The primary MS 30a and the secondary MS 30b provide various announcements and collect information from callers operating from communication devices 22a or 22b when features requiring caller interaction are required to complete a call. For example, if the caller must enter digits or a phrase for a Call Prompter service or SDN service, which can be provided by the multi-media services provider system 10a, the primary MS 30 or the secondary MS 30b will play the announcement prompting the caller to enter the required information. The primary MS 30a or the secondary MS 30b further collects the information entered by the caller, which is defined herein as "caller-entered data."

The media services provider system 10a uses the HTTP protocol between the primary MS 30a or the secondary MS 30b and any one of the plurality of ASs 32a–32c for communicating the caller-entered data. The HTTP protocol is suited for the transfer of data, and even customer logic in the form of VoiceXML scripts; this provides the flexibility to offer advanced features in unique ways. In addition, HTTP provides a simpler interface than SIP because the SIP protocol takes many message exchanges before establishing a session, and therefore, HTTP places less demand on real-time resources at the primary MS 30a or secondary MS 30b and the plurality of ASs 32a–32c.

Figure 3:
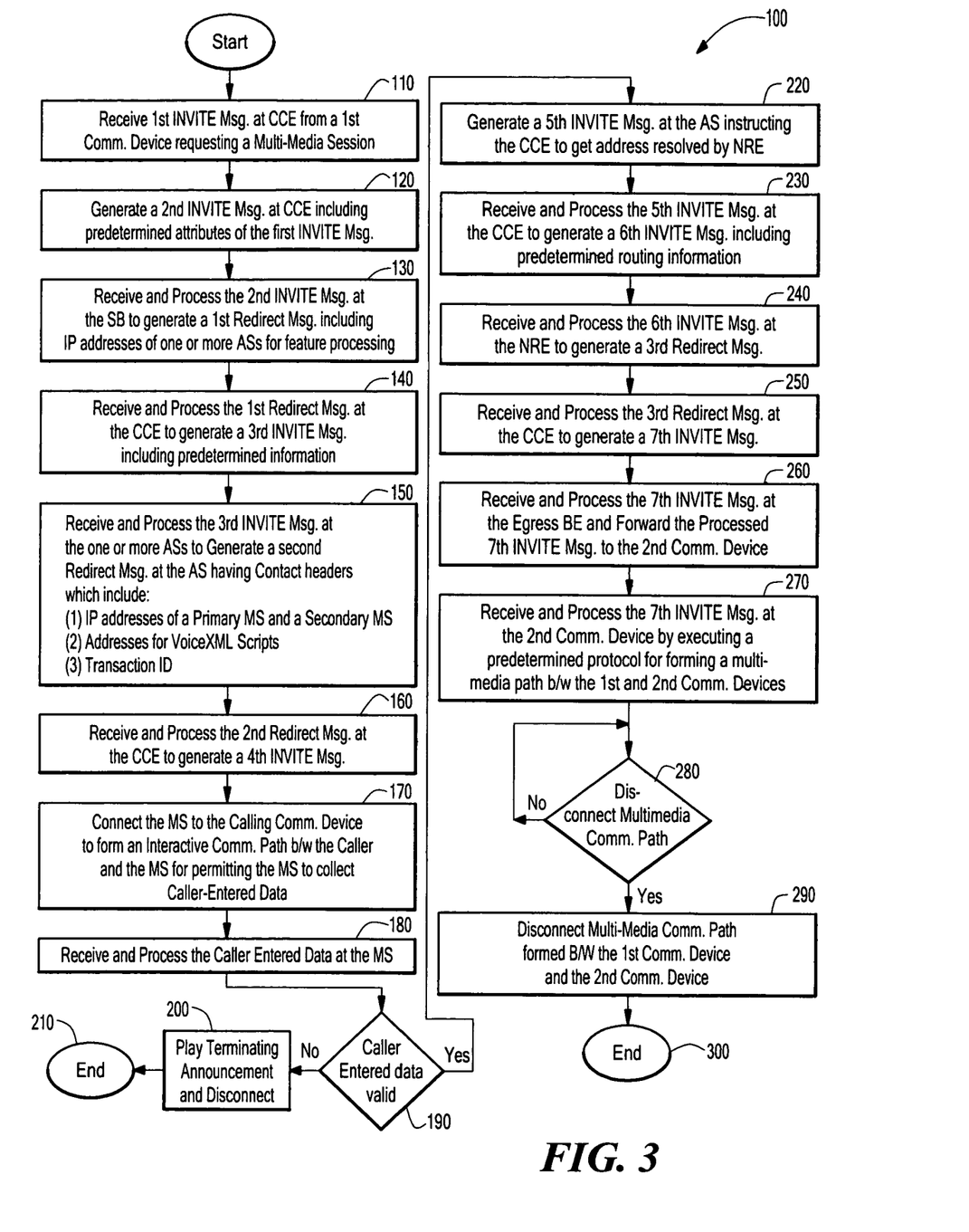
FIG. 3 is a high level flow chart illustrating process steps executable on the system of FIG. 2.

Referring now to FIG. 3, which shows an exemplary call flow diagram for executing the method 100 on the communication network 10 of FIG. 2 to provide multi-media services between the first 22a and second 22b communication devices, in accordance with the present invention. The call flow described in the exemplary call flow diagram provides a generic call flow in the communication network 10, where generally one of the communication devices 22a, for example, initiates a call by sending a first INVITE message to the CCE 24, via the first PBX and BE 26d. The CCE 24 generates a second INVITE message and populates appropriate parameters in a message body portion of the second INVITE message with the provisioned customer data such as the Charge Number, LATA, Charge Party Station Type (a.k.a. OLI) and Carrier among other things and also other information that were signaled in from the originating or first communication device 22a. Thereafter, the CCE 24 sends the second INVITE message to the SB 36.

The SB 36 executes predetermined match functionality (e.g., match based on ANI, or DN) to identify the service match for call processing. The SB 36 also sends a SIP Re-direct 300 Multiple Choice message to the CCE 24, which includes the IP address and Port number combination of the elected AS 32a–32c for processing the call request, such as the first AS 32a (e.g., SDN-AS 32a). Accordingly, the CCE 24 sends a third INVITE message, which includes the call request, to the first AS 32a for feature processing of the call request. The first AS 32a can execute the customer logic and can determine whether the call request requires "Account Code and Authorization Code" to further process the call request.

If the first AS 32a determines that the call request requires Account Code and Authorization Code, the AS 32a returns a URL for VoiceXML scripts (that contains the primary MS 30a (for example) resources, such as announcements) to the CCE 24 instructing the CCE 24 to generate and send a fourth INVITE message to the VoiceXML based MS 30a (primary) or to the MS 30b (secondary) with instructions to play announcement and collect digits or to play a terminating announcement and disconnect the call.

The CCE 24 using the Third Party Call Control mechanism connects the primary MS 30a, for example, and the caller operating at the first communication device (via the fourth BE 26d) for permitting the primary MS 30a to play announcements and collect digits. The primary MS 30a fetches VoiceXML script and audio files, via an HTTP operation with the first AS 32a, and plays the announcement to the first communication device 22a. Upon collecting the caller-entered data, the primary MS 30a sends the collected caller-entered data along with the transaction ID, which the primary MS 30a received in the fourth INVITE message, to the first AS 32a using an HTTP Form Post message.

The receipt of the HTTP Form Post message, with a transaction ID, triggers the first AS 32a to access the corresponding customer account and bypass the initial steps of the account logic and jump to the appropriate data validation logic. Upon validating caller-entered data, the first AS 32a returns a new routing number along with other data in a fifth INVITE message, which is sent to the CCE 24. The CCE 24 passes the information it received from the first AS 32a to the NRE 36 in a sixth INVITE message for address resolution, along with a new routing number of the called party. The CCE 24 sends a BYE message to the primary MS 30a to disconnect the call leg previously formed between the CCE 24 and the primary MS 30a. The NRE performs the address resolution and sends the routing information back to the CCE 24 with instructions to route the call to the called party, which for example can be located at the second communication device 22b. The CCE 24 sends a seventh INVITE message to the egress BE 26b with NULL SDP, and upon receipt of the 183 progress message with SDP, the CCE 24 sends a re-INVITE to the fourth BE 26d (e.g. ingress BE 26d) with the called Party's SDP to form a multi-media path between the caller at the first communication device and the called party at the second communication device 22b.

In an exemplary embodiment, the method commences by the calling party initiating a call at the first communication device 22a by dialing the number for the destination address (i.e., first communication device initiates a first INVITE message with a Called Party Number and other information). The first INVITE message arrives at the fourth BE 26d (e.g. ingress BE 26d), for example. The user-agent parameter of the first INVITE message contains "user=phone" where the phone number is an E.164 phone number. For example, the E.164 phone number can be defined as: INVITE sip:+732.420.4699@att.com; user=phone SIP/2.0. The user-agent parameter set to "user=phone" distinguishes that the Request-URI address is a telephone number (called party number) rather than a user name. The ingress BE 26d inserts a Record-Route header into the first INVITE message to ensure that all subsequent messages communicated by either the calling party at the first communication device 22a or the called party at the second communication device 22b are sent back and forth between each other, via the ingress BE 26d. The ingress BE 26d further forwards the first INVITE message to the CCE 24.

At step 110, the CCE receives the first INVITE message originating from the first communication device and requesting multi-media services. Upon receipt of the first INVITE message, the CCE 24 puts the "calling party leg on hold" and sends a 100 Trying message to the ingress BE 26d.

At step 120, the CCE 24 generates a second INVITE message, which the CCE 24 populates with provisioned customer data, such as the Charge Number, LATA (Local Access Transport Area), Charge Party Station Type (a.k.a. OLI), Carrier information and other various information provided by the caller operating at the first communication device 22a. The CCE 24 forwards the second INVITE message to the SB 36 and waits for a 300 Multiple Choice Redirect message, which is provided to the CCE 24 from the SB 36 in response to the second INVITE message. The 300 Multiple Choice Redirect message can indicate that AS 32a–32c processing is or is not required to process the call request. Further, the SB 36 determines whether AS 32a–32c processing is required or is not required to process the call request based on parameters contained in a body portion of the second INVITE message. In an embodiment, the second INVITE message can include the following information:

INVITE sip: 732.420.8080@as-sdn-nj.att.com; user=phone SIP/2.0
    Via SIP/2.0/UDP cce-nj.att.com;com:5060
    Via: SIP/2.0/UDP be-mt-nj.att.com:5060
    Via: SIP/2.0/UDP mypc.att.com:5060
    Max-Forwards: 50
    From: <sip:732.420.7070@att.com>
    To: <sip: 732.420.8080@att.com>
    Call-ID: c3904563-3119a-2995c 2e322238@mypc.att.com
    CSeq: 100 INVITE
    Route-Record: <be-mt-nj.att.com>
    Contact: sip:732.420.7070@mypc.att.com:5060
    Content-Type: application/vnd.att-advnced-services; boundary="- - att-advanced-services- -"
    Content-Disposition: session
    Content-Length: nnn
    MIME-Version: 1.0
    - - att-advanced-services
    cn=7323781000;3;1 /* cn;cn-non;cn-np
    cpst=32
    beid=be
    ca=7324208080;3;1 /* ca;ca-non;ca-np
    cic=288;1;0 /* cic;cs;noc
    l=222
    - - att-advanced-services - -

At step 130, the SB 36 receives the second INVITE message from the CCE 24 and processes the second INVITE message by executing an SB-function, which responds to information such as a charge number, dialed number, and Carrier Selection to determine whether an application associated with any one of the AS 32a–32c needs to be accessed to further process the call. The SB-function includes identifying the specific AS 32a, 32b and/or 32c (e.g., 8YY-AS or SDN-AS), IP address and Port number combination (for both primary and secondary ASs 32a–32c) if the call request requires feature processing. If based on the information received in the second INVITE message, the SB 36 decides that the call request requires an AS 32a, 32b or 32c for feature processing, the SB 36 generates a first 300 Multiple Choice Redirect message (hereinafter "first Redirect message"). The SB 36 populates the contact headers of the first Redirect message with the IP address/port number combination of the application and associated primary and secondary ASs 32a, 32b and/or 32c. Thereafter, the SB 36 sends the first Redirect message to the CCE 24.

At step 140, based on the received IP address of the primary AS, such as AS 32a, the CCE generates a third INVITE message that includes predetermined information, such as the Charge Number, LATA, and Carrier among other things, and sends the third INVITE message to the first AS 32a (e.g. primary AS 32a). At step 150, the first AS 32a receives and processes the third INVITE message by accessing the ANI translation table that maps the origination address to a customer account ID. Using the customer account ID from the ANI translation table, the first AS 32a accesses the customer's account to apply appropriate screening and feature processing for the call. Furthermore, the first AS 32a can determine that the call request requires additional information from the user before proceeding further to process the call.

In this instance, the first AS 32a returns a second 300 Multiple Choice Re-direct message (herein after "second Redirect message") back to the CCE 24, which includes Contact header(s) having IP addresses of the primary MS 30a and the secondary MS 30b. The second Re-direct message can further include URL address for VoiceXML scripts, which contains the media resources such as announcements. In addition, the second Re-direct message can include a transaction ID to the CCE 24 instructing the CCE 24 to initiates a fourth INVITE message to the VoiceXML based MS 32a (e.g. primary) to play announcement and collect digits or play terminating announcement and disconnect the call. In an exemplary embodiment, the second Re-direct message can include the following information:

SIP/2.0 300 Multiple Choice
Via: SIP/2.0/UDP att.com:5060
From: sip:7324204699@att.com
To: <sip:7324201000@att.com>
Call-ID: c3904563-3119a-2995c 2e322238@att.com
CSeq: 100 INVITE
Content-Type: application/vnd.att-advnced-intelligent-services; boundary="-- att-advanced-services --"
Content-Length: nnn
Contact: <http://annsvr.att.com/leaf/sdnapp.vxml@mediaserver1.att.com
Contact: <http://annsvr.att.com/leaf/sdnapp.vxml@mediaserver2.att.com
-- att-advanced-services
TID=ax78s4563d
-- att-advanced-services --

At step 160, upon receipt of the second Re-direct message from the first AS 32a, the CCE 24 initiates the fourth INVITE message to the primary MS 30a, which includes the URL address for the VoiceXML scripts and the caller's SDP information that was initially received at the CCE 24 in the first INVITE message. This is accomplished by CCE 24 generating a fourth request message with Content-Type header having a multipart/mixed media type. The fourth request message further includes a first body portion having session description protocol information and a second body portion having service related parameters to establish an interactive session with a caller operating at the first communication device 22a, for example. In an exemplary embodiment, the fourth INVITE message can include the following information:

INVITE sip:http://annsvrl.att.com/leaf/sdnapp.vxml@medaiserver1.att.com SIP/2.0
Via: SIP/2.0/UDP att.com:5060
From: sip:7324204699@att.com
To: <sip:7324201000@att.com>
Call-ID: c3904563-3119a-2995c 2e322238@att.com
CSeq: 100 INVITE
Content-Type: multipart/mixed; boundary="att-advanced-services"
- - att-advanced-services
Content-Type: application/sdp
v=0
o=hsamarasinghe 2890844526 2890842807 IN IP4 126.16.64.4
s=IP to PSTN test call
c=IN IP4 ngbeI.att.com
t=2873397496 2873404696
m=audio 4563 RTP/AVP 0
a=rtpmap:0 PCMU/8000
- - att-advanced-services
Content-Type: application/vnd.att-advanced-intelligent-services
TID=ax78s4563d
- - att-advanced-services - -

At step 170, the CCE 24 connects the primary MS 30a and the caller operating at the first communication device 22a using the Third Party Call Control capability, as described above. The primary MS 30a fetches VoiceXML scripts and audio files using the URL it received, via an HTTP Get operation and plays the announcement. At step 180, upon collecting the caller-entered data from the caller, the primary MS 30a sends the collected caller-entered data along with a transaction ID to the first AS 32a, for example, via an HTTP Form Post message. The first AS 32a receives the HTTP Form Post message with the transaction ID. The transaction ID triggers the first AS 32a to access the corresponding customer account and bypass the initial steps of the account logic and jump to the appropriate data validation logic.

At step 190, if the first AS 32a determines that the caller-entered data is invalid, at step 200, the primary MS 30a plays a termination announcement to the caller at the first communication device and the method 100 ends at step 210. On the other hand, if the first AS 32a determines that the caller-entered data is valid, which indicates that the call request can proceed, at step 220, the first AS 32a generates and sends a fifth INVITE message to the CCE 24. The fifth INVITE message includes the new routing number and the recording information, which instructs the CCE 24 to get the address resolved by the NRE 33. Thereafter CCE 24 sends a BYE message to the MS 30a to disconnect the call leg formed between the CCE 24 and the primary MS 30a. The CCE 24 then sends a BYE message to the first AS 32a to disconnect the call leg formed between the first AS 32a and the CCE 24.

At step 230, upon receipt of the fifth INVITE message from the first AS 32a, the CCE 24 initiates a sixth INVITE message to the NRE 33 by populating appropriate parameters defined in the sixth INVITE message with the following predetermined routing information received in the fifth INVITE message: the Charge Number, LATA, Charge Party Station Type (a.k.a. OLI) and Carrier Identification Code (CIC) among other things, and waits for a third 300 Multiple Choice Redirect message (hereinafter "third Redirect message") from the NRE 33.

At step 240, upon receipt of the sixth INVITE message from the CCE 24, the NRE 33 performs the address resolution functions and populates the appropriate parameters defined in the third Redirect message. Thereafter, the NRE 33 sends the third Redirect message to CCE 24 with the IP addresses of multiple BE 26a–26d in a hierarchical list, so that in the event that the first BE 26a does not have enough resources to process the call request, the CCE 24 can attempt to send the call request to the next successive BE 26b–26d defined on the hierarchical list.

At step 250, upon receiving the third Redirect message from the NRE 33, the CCE 24 creates a Call Detail Record for the call by using the billing instructions returned from the first AS 32a. Further, the CCE 24 generates a seventh INVITE message, which is sent to the egress BE 26b, for example, by mapping all relevant parameters defined in the fifth INVITE message. The CCE 24 also inserts a Record-Route header into the seventh INVITE message to ensure that all subsequent messages by either party (e.g. calling party operating from the first communication device 22a and the called party operating from the second communication device 22b) are sent via the CCE 24. After generating the seventh INVITE message at the CCE 24, as described above, the CCE 24 sends the seventh INVITE message with NULL SDP to the second BE 26b (e.g. egress BE 26b).

At step 260, upon receipt of the seventh INVITE message at the egress BE 26b, the egress BE 26b inserts another Record-Route header into the seventh INVITE message to ensure that all subsequent messages by either party operating from the first 22a and second 22b communication devices are sent via the egress BE 26b. Furthermore, the egress BE 26b forwards the seventh INVITE message to the called party operating at the second 22b communication device, via an optional SIP enabled IP PBX 34b.

At step 270, in response to receipt of the seventh INVITE message, the second communication device 22b commences a predetermined protocol for forming a multi-media path between the first and second communication devices. In an embodiment, the predetermined protocol includes the called party at the second communication device 22b returning a 183 Session Progress message to the egress BE 26b with the SDP information of the second communication device 22b. Upon receipt of the 183 Session Progress message, the egress BE 26b forwards the 183 Session Progress message to the CCE 24 with the SDP information. Upon receiving the 183 Session Progress message, the CCE 24 sends a re-INVITE message to the caller operating at the first communication device 22a, via the ingress BE 26d. The re-INVITE message includes the called party's SDP information to reinitialize a media path between the caller operating at the first communication device 22a and the called party operating at the second communication device 22b by using the Third Party Call Control feature, as described above.

The calling party at the first communication device 22a sends a 200 OK message to the CCE 24, via the egress BE 26d. Upon receiving the PRACK message, the called party at the second communication device 22b returns a 200 OK message to the calling party at the first communication device 22a, via the egress BE 26b, CCE 24, and the ingress BE 26d. At this point, the two end-devices or first 22a and second 22b communication devices communicate with each other for resource reservation using RSVP-TE.

After resource reservation, the calling party at the first communication device 22a sends an UPDATE message to the called party at the second communication device 22a confirming success. In response to receipt of the 200 OK for the first INVITE message, the calling party at the first communication device 22a sends an ACK message to the called party at the second communication device 22b, via the CCE 24. At this instant, a multi-media path is formed between the calling party at the first communication device and the called party at the second communication device.

At step 280, if the calling party at the first communication device 22a decides to end the conversation or disconnect the multi-media path, for example, the first communication device 22a sends a BYE message to the ingress BE 26d. Upon receipt of the BYE message, the ingress BE 26d creates a CDR and forwards the BYE message to the CCE 24. The CCE 24 creates a CDR upon receipt of the BYE message from the ingress BE 26d, and forwards the BYE message to the egress BE 26b. Upon receipt of the BYE message from the CCE 24, the egress BE 26b creates a CDR and forwards the BYE message to the called party at the second communication device. At step 290, the multi-media path previously formed between the first 22a and second 22b communication devices is disconnected and the method 100 ends at step 300.

While various features of the present invention are described herein in conjunction with exemplary embodiments having various components using a number of protocols, it should be understood that other suitable components and protocols can be used without departing from the present invention.

Having thus described at least one illustrative embodiment of the invention, various alterations, modifications and improvements will readily occur to those skilled in the art. Such alterations, modifications and improvements are intended to be within the scope and spirit of the invention. Accordingly, the foregoing description is by way of example only and is not intended as limiting. The invention's limit is defined only in the following claims and the equivalents thereto. All references and publications cited herein are expressly incorporated herein by reference in their entirety.

What is claimed is:

1. A method of processing multi-media service requests received at a multi-media services provider system to form a multi-media communication path between at least a first communication device and at least a second communication device of a plurality of communication devices, the method comprising:

receiving at least a first request message for at least one multi-media service at a call control element located on the multi-media services provider system from the first communication device;

processing the first request message at the call control element located on the multi-media services provider system to generate a second request message for the at least one multi-media service including predetermined attributes of the first request message;

receiving and processing the second request message at a service broker located on the multi-media services provider system for generating a first redirect message including predetermined attributes of the second request message;

receiving and processing the first redirect message at the call control element located on the multi-media services provider system for generating a third request message including predetermined attributes of the first redirect message;

receiving and processing the third request message at one or more application servers located on the multi-media services provider system for generating a second redirect message, wherein the second redirect message includes at least a first contact header having address-related information associated with a primary media server located on the multi-media services provider system and a second contact header having address-related information associated with a secondary media server located on the multi-media services provider system;

receiving and processing the second redirect message at the call control element to generate a fourth request message including a Content-Type header having a multipart/mixed media type;

wherein the fourth request message further includes a first message body portion including session description protocol associated with the first request message and a second message body portion including service related parameters to establish an interactive session with a predetermined caller; and querying the primary media server for determining whether the primary media server includes resources for processing the fourth request message.

2. The method for processing multi-media service requests of claim 1, further including:

receiving the fourth request message at the primary media server if it is determined that the primary media server includes resources for processing the fourth request message; and processing the fourth request message at the primary media server to form an interactive communication path between the primary media server and the first communication device.

3. The method for processing multi-media service requests of claim 2, further including:

receiving user-entered data at the primary media server;

communicating the user-entered data to at least one application server located on the multi-media services provider system; and determining whether the user-enter data is valid at the application server, wherein if the user-entered data is determined as valid, the method further includes generating a fifth request message at the application server including address resolution instructions and wherein if the user-entered data is determined as invalid, the method further includes playing a termination announcement to the first communication device.

4. The method for processing multi-media service requests of claim 3, further including: receiving and processing the fifth request message at the call control element for generating a sixth request message that includes predetermined routing information.

5. The method for processing multi-media service requests of claim 4, further including: receiving and processing the sixth request message at the network routing element for generating a third redirect message.

6. The method for processing multi-media service requests of claim 5, further including:
receiving and processing the third redirect message at the call control element for generating a seventh request message.

7. The method for processing multi-media service requests of claim 6, further including:
receiving and processing the seventh request message at the second communication device, wherein the second communication device initiates a predetermined protocol for forming a multi-media communication path between the first communication device and the second communication device.

8. The method for processing multi-media service requests of claim 1, further including:
querying the secondary media server for determining whether the secondary media server includes resources for processing the fourth request message if it is determined that the primary media server includes insufficient resources for processing the fourth request message.

9. The method for processing multi-media service requests of claim 8, further including:
receiving the fourth request message at the secondary media server; and processing the fourth request message at the secondary media server to form an interactive communication path between the secondary media server and the first communication device.

10. A system for processing multi-media service requests received at a multi-media services provider system to form a multi-media communication path between at least a first communication device and at least a second communication device of a plurality of communication devices, the system comprising:

a call control element located on the multi-media services provider system adapted to receive at least a first request message for at least one multi-media service from the first communication device and to process the first request message to generate a second request message for at least one multi-media service including predetermined attributes of the first request message;

a service broker located on the multi-media services provider system and being adapted to receive and process the second request message to generate a first redirect message, the call control element receiving and processing the first redirect message to generate a third request message including predetermined attributes of the first redirect message; and at least one application server located on the multi-media services provider system and being adapted to generate a second redirect message, wherein the second redirect message includes at least a first contact header having address-related information associated with a primary media server located on the multi-media services provider system and a second contact header having address-related information associated with a secondary media server located on the multi-media services provider system, wherein the second redirect message further includes a transaction identifier field that triggers the application server to access a corresponding customer account and bypass predetermined account logic and jump to predetermined data validation logic.

* * * * *